though the top of the tank.
UNITED STATES PATENT OFFICE.

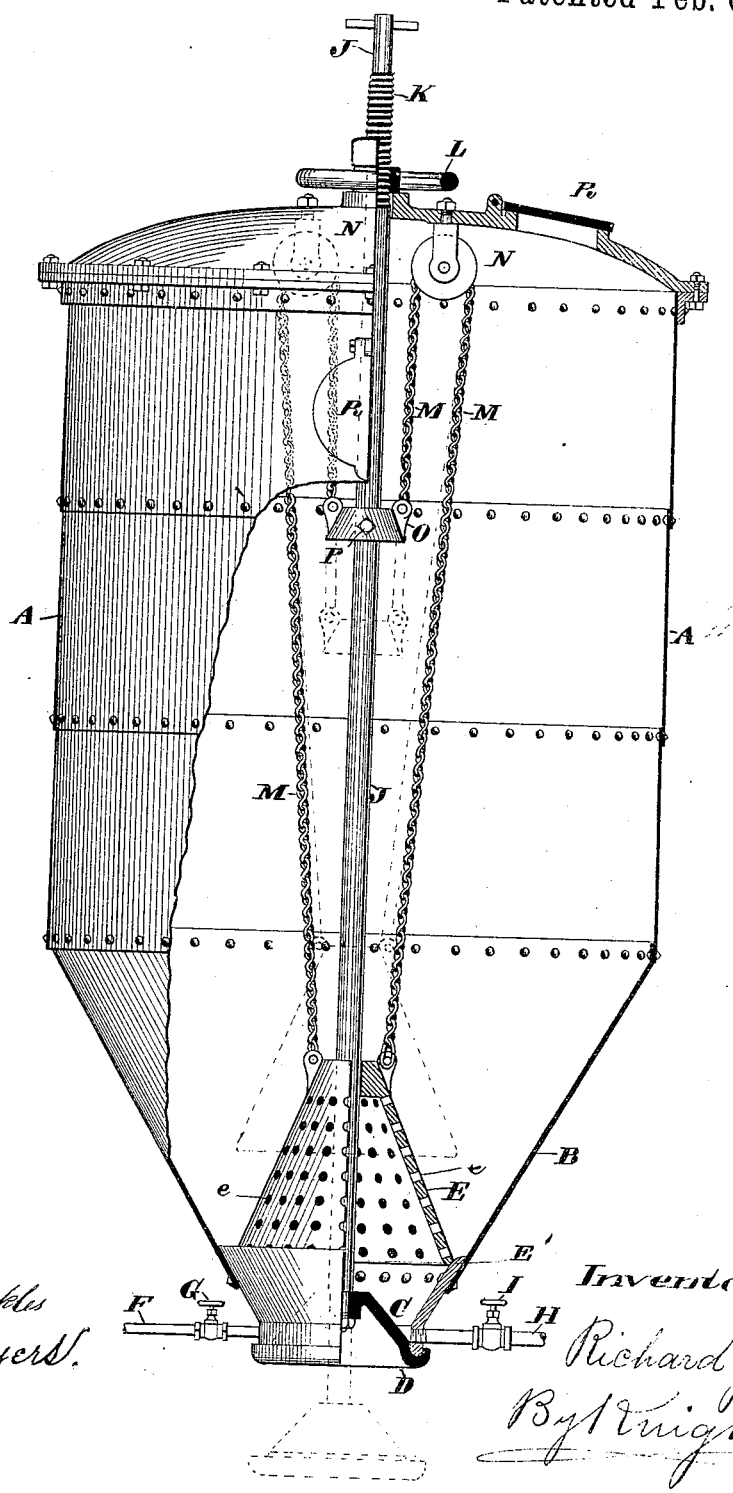

RICHARD GARSTANG, OF ST. LOUIS, MISSOURI.

RENDERING-TANK.

SPECIFICATION forming part of Letters Patent No. 271,700, dated February 6, 1883.

Application filed July 22, 1882. (No model.)

*To all whom it may concern:*

Be it known that I, RICHARD GARSTANG, of the city of St. Louis, in the State of Missouri, have invented a certain new and useful Improvement in Rendering-Tanks, of which the following is a specification, reference being had to the accompanying drawing, forming part of the same.

My improvement consists in connecting to the valve-rod a movable strainer that covers the mouth of the tank, and which moves upward as the valve opens downward, so that the whole contents of the tank may escape through the mouth.

The drawing is part in elevation and part in vertical axial section.

The tank is made in a usual form, with a cylindrical body, A, having a conical extension at bottom, B, allowing the easy and perfect discharge of the whole contents at the mouth C. The mouth is closed by a valve, D, when the tank is in use.

E is a conical or bell-formed strainer, covering the mouth C, and having holes e, as shown, to allow the liquid to descend into the mouth, while the solid matters are restrained.

F is the steam-pipe, through which steam enters for the heating of the contents of the tank, the pipe having a valve or cock, G, as usual.

H is a pipe through which liquid may be drawn from the tank, and I is a valve or cock therein.

J is the valve-rod, extending up through an axial socket in the strainer, and through the top of the tank. The rod J is screw-threaded at K, and has a hand-nut with squared hub to receive a key, L, turning upon it and bearing against the top of the tank, by which the valve is drawn up hard to the mouth. The rod may be raised or lowered by hand, or by any suitable mechanism.

M are chains, of which the lower ends are connected to the strainer E, and which pass over pulleys N, beneath the top of the tank, and descend to a collar, O, to which they are attached. The collar O surrounds the rod J, and is secured thereto by a set-screw, P. The arrangement is such that when the valve is closed against the mouth the lower edge of the strainer rests upon its seat E', as shown in full lines in the drawing, while the downward movement of the valve in opening the mouth C lifts the strainer and allows the solid contents of the tank to pass freely through the mouth.

R are man-holes, through which material is fed into the tank, and through which access may be had with the interior.

It will be observed that the strainer may be made to exactly counterbalance the valve and rod, so that the valve and strainer may be moved upward and downward with ease.

I claim—

1. A rendering-tank having a bottom vent, C, covered by a movable strainer, E, combined with a steam-supply pipe discharging into the tank beneath the strainer.

2. The combination, in a rendering-tank, of the downwardly-opening valve D and lifting strainer E, for the purpose set forth.

3. In a rendering-tank, the valve-rod J and strainer E, connected together by chain or chains passing over pulley or pulleys above, for the purpose set forth.

RICHARD GARSTANG.

Witnesses:
SAML. KNIGHT,
GEO. H. KNIGHT.